United States Patent
Morgulis

(10) Patent No.: US 8,602,694 B2
(45) Date of Patent: Dec. 10, 2013

(54) THREAD-MILLING CUTTER AND THREAD-MILLING INSERT

(75) Inventor: Rafael Morgulis, Carmiel (IL)

(73) Assignee: Vargus Ltd. (IL)

( * ) Notice: Subject to any disclaimer, the term of this patent is extended or adjusted under 35 U.S.C. 154(b) by 245 days.

(21) Appl. No.: 13/213,739

(22) Filed: Aug. 19, 2011

(65) Prior Publication Data
US 2012/0045288 A1    Feb. 23, 2012

(30) Foreign Application Priority Data

Aug. 20, 2010   (EP) ..................................... 10173510

(51) Int. Cl.
*B23G 5/18*        (2006.01)
*B23C 5/22*        (2006.01)

(52) U.S. Cl.
USPC ................... 407/25; 407/24; 407/29; 409/65

(58) Field of Classification Search
USPC ............... 407/24, 25, 29, 40–43, 47, 49, 113, 407/108; 409/65
See application file for complete search history.

(56) References Cited

U.S. PATENT DOCUMENTS

| | | | | |
|---|---|---|---|---|
| 735,413 A | * | 8/1903 | Schellenrach | 408/170 |
| 1,730,399 A | * | 10/1929 | Wetmore | 408/233 |
| 1,778,260 A | * | 10/1930 | Kearney | 407/38 |
| 1,874,536 A | * | 8/1932 | Irwin | 76/115 |
| 2,227,281 A | * | 12/1940 | Smith | 408/222 |
| 2,456,842 A | * | 12/1948 | Rutbell | 407/40 |
| 3,812,547 A | * | 5/1974 | Reich | 470/80 |
| 4,205,932 A | * | 6/1980 | Tennutti | 407/25 |
| 4,655,648 A | * | 4/1987 | Hellbergh | 407/42 |
| 4,913,604 A | * | 4/1990 | Zaengerle | 409/74 |
| 5,088,861 A | * | 2/1992 | Little | 407/11 |
| 5,098,232 A | * | 3/1992 | Benson | 407/33 |
| 5,112,162 A | | 5/1992 | Hartford | |
| 5,325,748 A | * | 7/1994 | Ehrenberg | 82/13 |
| 5,873,684 A | * | 2/1999 | Flolo | 409/66 |
| 5,890,852 A | * | 4/1999 | Gress | 408/221 |
| 5,924,825 A | * | 7/1999 | Schwab et al. | 407/42 |
| 6,012,882 A | | 1/2000 | Turchan | |
| 6,224,299 B1 | * | 5/2001 | Frecska et al. | 407/41 |

(Continued)

FOREIGN PATENT DOCUMENTS

| | | |
|---|---|---|
| EP | 0 261 465 A2 | 3/1988 |
| FR | 919 599 A | 3/1947 |
| GB | 712 083 A | 7/1954 |
| JP | 60034208 A * | 2/1985 |
| WO | 95/16534 A1 | 6/1995 |

*Primary Examiner* — Andrea Wellington
*Assistant Examiner* — Sara Addisu
(74) *Attorney, Agent, or Firm* — Akerman Senterfitt

(57) ABSTRACT

A thread-milling cutter including a tool holder (2) and at least one cutting insert (3) with a longitudinal cutting edge (30) mounted on it. The tool holder (2) includes at least one pocket (20) extending essentially in an axial direction (A) and adapted for receiving the at least one insert (3). The cutting insert (3) has at least one positioning plane (31) on a first abutment surface of the insert (3) opposite the cutting edge (30) for a radial positioning of the insert (3) in the respective pocket (20). At least one protrusion (32) is provided on the abutment surface, a side surface (320) of the protrusion (32) being oriented at an angle ($\alpha$) to the axial direction (A) of the cutter (1) and adapted for contacting a surface (22) of the pocket (20) for an axial positioning of the insert (3). Also described is an insert for a thread-milling cutter.

10 Claims, 3 Drawing Sheets

(56) References Cited

U.S. PATENT DOCUMENTS

| | | |
|---|---|---|
| 6,499,917 B1 | 12/2002 | Parker |
| 6,682,271 B2 * | 1/2004 | Kichin ............................ 407/24 |
| 7,044,692 B2 * | 5/2006 | Weise et al. ..................... 409/74 |
| 7,107,664 B2 * | 9/2006 | Weise et al. ..................... 29/557 |
| 7,607,868 B2 * | 10/2009 | Noggle .......................... 407/113 |
| 7,780,381 B2 * | 8/2010 | Sjoo et al. ...................... 407/113 |
| 8,033,764 B2 * | 10/2011 | Noggle .......................... 407/113 |
| 8,096,734 B2 * | 1/2012 | Sjoo ............................... 407/23 |

* cited by examiner

THREAD-MILLING CUTTER AND THREAD-MILLING INSERT

This application claims the benefit of priority application EP 10173510.8, filed Aug. 20, 2010, the entire contents of which is incorporated herein by reference.

BACKGROUND

The invention relates to a thread-milling cutter comprising a tool holder and at least one cutting insert with a longitudinal cutting edge mounted thereon. The invention further relates to an insert for a thread-milling cutter.

Thread-milling with thread-milling cutters comprising a holder and an insert mounted therein requires a high accuracy of positioning the inserts in the tool holder. U.S. Pat. No. 6,499,917 B1 discloses a thread-milling cutter including a tool holder with cutting insert pockets and a thread-milling insert received in respective pockets. Each insert is provided with several recesses formed on a lateral surface thereof for forming an abutment surface that is engaged by a screw to secure the insert in the pocket. The recesses are inclined in a manner causing the screw to push the insert deeper into the pocket.

It is the object of the invention to provide a thread-milling cutter especially suitable for small diameters having a high rigidity. It is another object of the present invention to provide an insert therefore. This object is solved by a thread-milling cutter and an insert described herein.

SUMMARY

It is the basic idea of the invention to provide a cutting insert with a longitudinal cutting edge and/or to provide a thread-milling cutter comprising a tool holder and at least one cutting insert with a longitudinal cutting edge mounted thereon, the tool holder comprising at least one pocket extending essentially in an axial direction and adapted for receiving the at least one insert, and the cutting insert having at least one positioning plane on a first abutment surface of the insert opposite the cutting edge for a radial positioning of the insert in the respective pocket, wherein at least one protrusion is provided on the abutment surface, a side surface of the protrusion being oriented at an angle to the axial direction of the cutter and adapted for contacting a surface of the pocket for an axial positioning of the insert.

The positioning plane extends parallel to the axial direction of the insert. The protrusion projects from the positioning plane and allows an accurate and repeatable axial positioning of the at least one insert on the holder. The side surface projects away from positioning plane in a direction opposite to the cutting edge, thereby enlarging the width of the cutting insert in the region of the protrusion. In one embodiment, the side surface of the protrusion is flat and oriented with a fixed angle to the positioning plane. In other embodiments, curved side surfaces are provided, wherein the angle is defined as the mean tangential plane of the side surface. In preferred embodiments, the protrusion also defines a clamping region for fixing the insert in the holder. To this end, the protrusion is provided with a defined height for allowing clamping elements to co-operate with the protrusion. The length of the protrusion and a respective pocket having a pre-defined height depends on the angle of the side surface with the axial direction. Larger angles result in shorter protrusions having the same height.

In accordance with a preferred embodiment the side surface of the protrusion contacting the pocket and/or the respective surface of the pocket are arranged at an angle of at least 30°, preferably at least 40° to the axial direction of the cutter. Angles of at least 30°, preferably at least 40° allow a good axial positioning, wherein the overall length of the pocket in the holder is minimized. Thereby, a weakening of the holder due to the formation of the pockets may be minimized and a rigidity of the cutter is enhanced.

In accordance with a preferred embodiment, the first abutment surface of the insert is provided with two positioning planes sandwiching the protrusion. When providing two positioning planes a stable radial positioning is given. The two positioning planes are arranged parallel or coplanar. Preferably, the at least one pocket is formed as a complimentary recess having two flat walls and a cavity formed there between.

The protrusion may have an arbitrary shape provided that a side surface functioning as an axial stopper is given. Preferably, the protrusion has a convex shape, in particular a circular segment shape. With such a shape a reliable positioning is achieved, wherein the size of the protrusion for co-operating with clamping elements is optimized.

Preferably at least one lateral surface of the insert contacts a lateral abutment surface of the respective pocket for a positioning of the insert, wherein at least one clamping element is provided for forcing the insert against the lateral abutment surface. In one embodiment, wedge elements are provided for fixing the inserts in the pockets. In accordance with preferred embodiments, screw holes communicating with the pockets are provided in which screws are inserted for forcing the inserts against the lateral abutment surface. In preferred embodiment, each insert is fixed with two screws in the pocket.

The clamping elements co-operate with a surface of the inserts. Preferably, the clamping elements co-operate with the surface of the protrusion. In preferred embodiments, the insert, in particular the protrusion, is provided with at least one recess for receiving the at least one clamping element. In preferred embodiments the at least recess and/or the at least one clamping element are each provided with a chamfer, so that during clamping the insert is forced in the pocket. Thereby, inserts are positioned with a high accuracy and a good repeatability.

In preferred embodiments, the protrusion is symmetrical to a median plane at right-angles with the axial direction of the insert. The symmetrical shape of the protrusion is optimized for a co-operation with two clamping elements. In one embodiment, the insert is formed as an indexable insert.

In accordance with another embodiment, the tool holder is provided with at least two pockets adapted for receiving an insert each, wherein the cutting edges of the inserts overlap at least partially in the axial direction of the cutter. As in accordance with the invention, the width of the insert and the respective pockets may be chosen small with the exception of the protrusion, the pockets may be arranged such that only narrow parts of the pockets overlap, thereby the rigidity of the cutter is enhanced.

BRIEF DESCRIPTION OF THE DRAWINGS

In the following, an embodiment of the invention will be described in detail based on several schematic drawings in which.

Throughout the drawings, the same or similar elements will be denoted by the same reference numerals.

DETAILED DESCRIPTION

Figure 1:
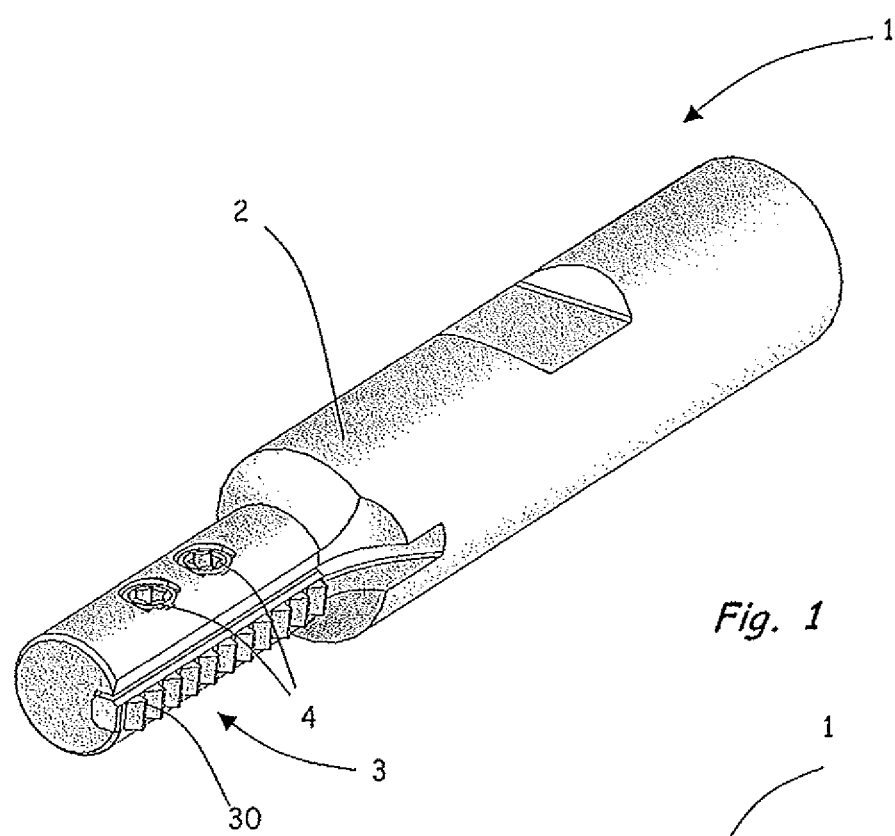
FIG. 1: is a schematic isometric view of the cutter with a holder and one insert.
Figure 2:
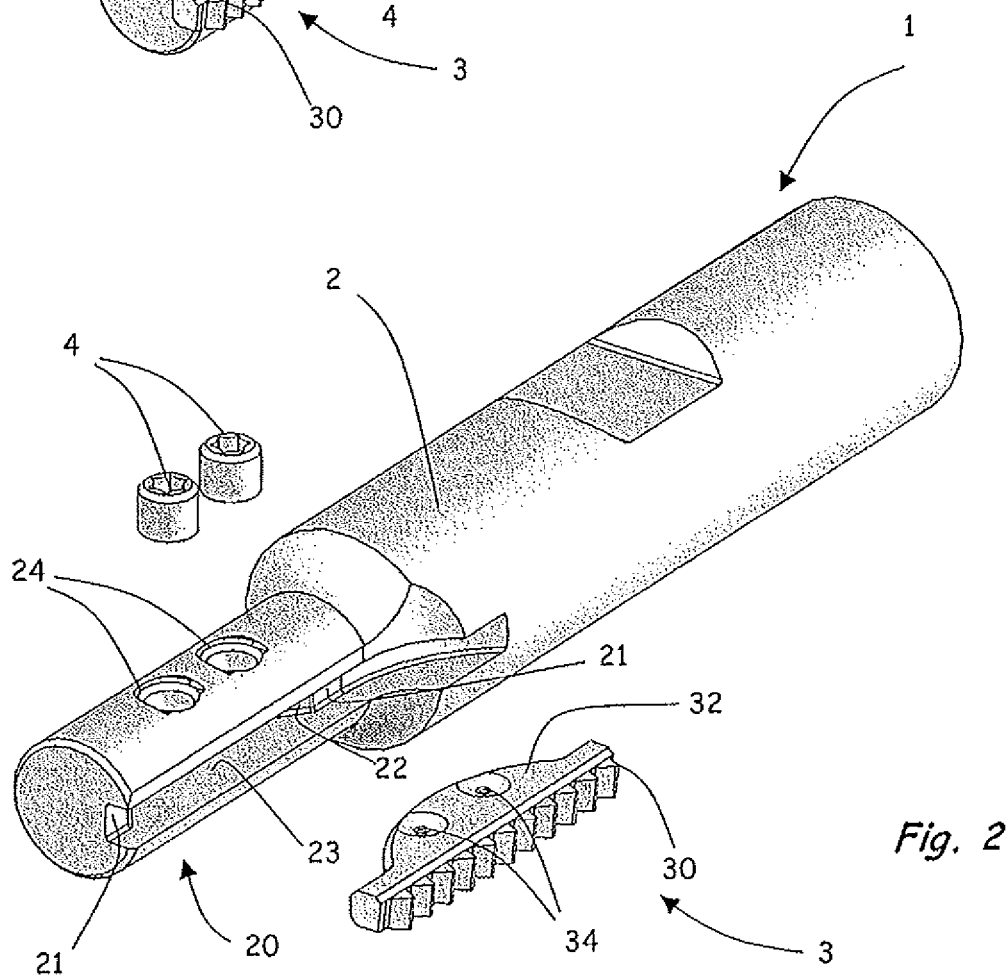
FIG. 2: is an exploded isometric view of the cutter of FIG. 1.

FIGS. 1 to 4 show a first embodiment of an inventive thread-milling cutter 1 comprising a tool holder 2 and one cutting insert 3 with a longitudinal cutting edge 30 mounted thereon. The insert 3 is also shown in FIG. 5.

The tool holder 2 shown in FIGS. 1 to 4 comprises one pocket 20 extending 20 essentially in an axial direction A. The pocket 20 is adapted for receiving the insert 3.

The cutting insert 3 is provided with two positioning planes 31 on a first abutment surface of the insert 3 opposite the cutting edge 30 contacting walls 21 of the pocket 2 arranged parallel to the axial direction A for a radial positioning of the insert 3 in the pocket 20.

Sandwiched between the two positioning planes 31, a protrusion 32 is provided on the abutment surface of the insert 3. A side surface 320 of the protrusion 32 is oriented at an angle α to the axial direction A of the cutter 1 and contacts a complimentarily oriented surface 22 of the pocket 2 for an axial positioning of the insert 3.

When positioning the insert 3 in the pocket 20, a lateral surface 33 of the insert 3 contacts a lateral abutment surface 23 of the pocket 2 for positioning the insert 3. In the depicted embodiment, two clamping elements n the form of two clamping screws 4 are provided for forcing the insert 3 against the lateral abutment surface 23. The holder 2 is provided with two threaded through holes 24 communicated with the pocket 20 in which the clamping screws 4 are inserted.

The protrusion 23 is provided with two chamfered recesses 34. The clamping screws 4 are provided with a chamfer on their face contacting the chamfered recesses 34 on the insert 3. The clamping screws 4 are provided with a right-hand thread. When inserting the clamping screws 4, a friction force between the chamfer on the clamping screw 4 and the chamfered recesses 34 forces the insert 3 in the direction of the contact surface 22 on the holder 2.

The protrusion is symmetrical to a median plane perpendicular to the axial direction of the insert 3. The height H of the protrusion 32 of the insert 3 and its form are chosen so as to allow the provision of two chamfered recesses 34. Apart from the region in which the protrusion 32 is provided, the insert 3 has a slim shape. The pockets 20 are formed complimentary, wherein the pocket 20 is shallow in the regions of the contact walls 21. This allows to provide a holder 2 which is less weakened in the region of the pocket 20 compared to holders with pockets for prior art inserts having the same height over the entire length.

Figure 3:
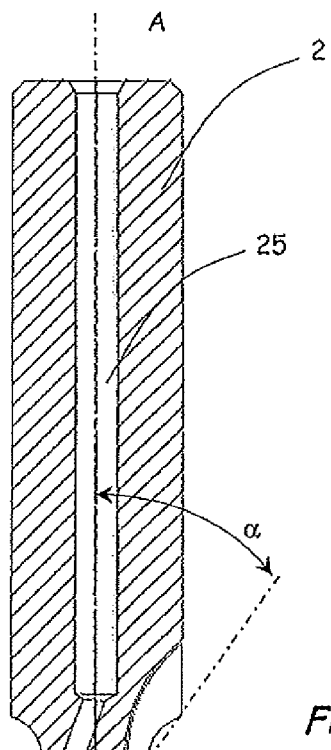
FIG. 3: is a schematic sectional top view of the cutter of FIG. 1.

As shown in FIG. 3, the holder 2 may be provided with a channel 25 for a cutting fluid.

Figure 4:
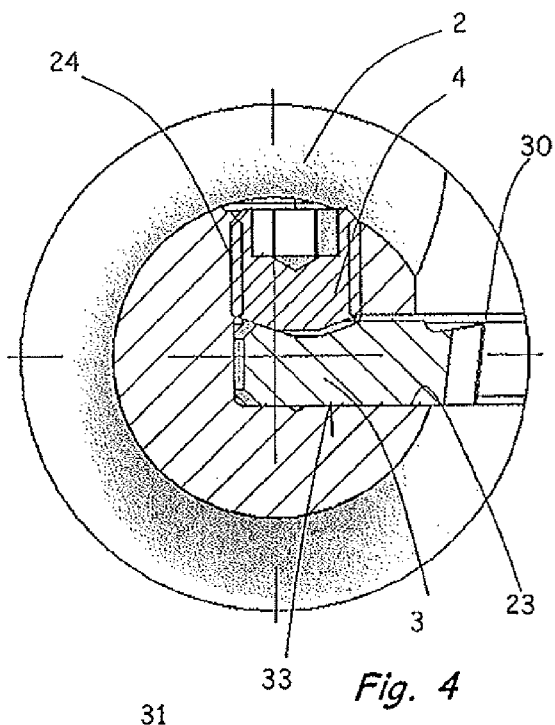
FIG. 4: is a schematic sectional front view of the cutter of FIG. 1.
Figure 5:
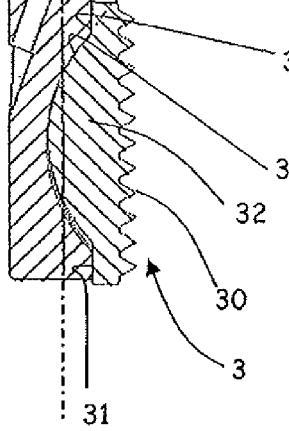
FIG. 5: is a schematic top view of an insert.
Figure 5:
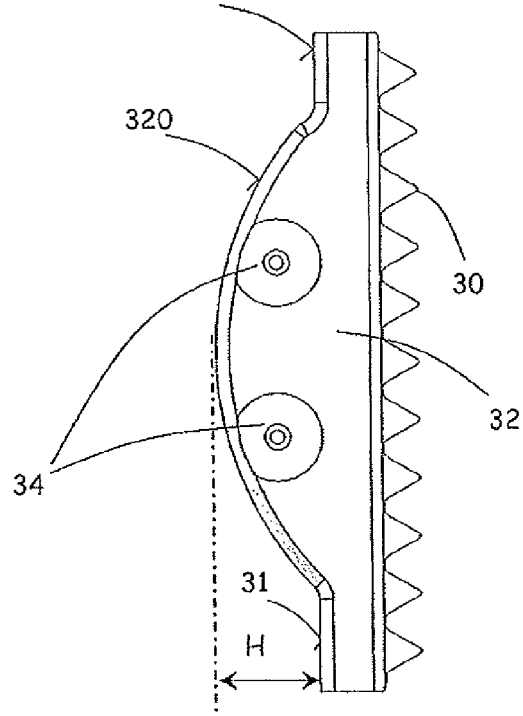
Figure 6:
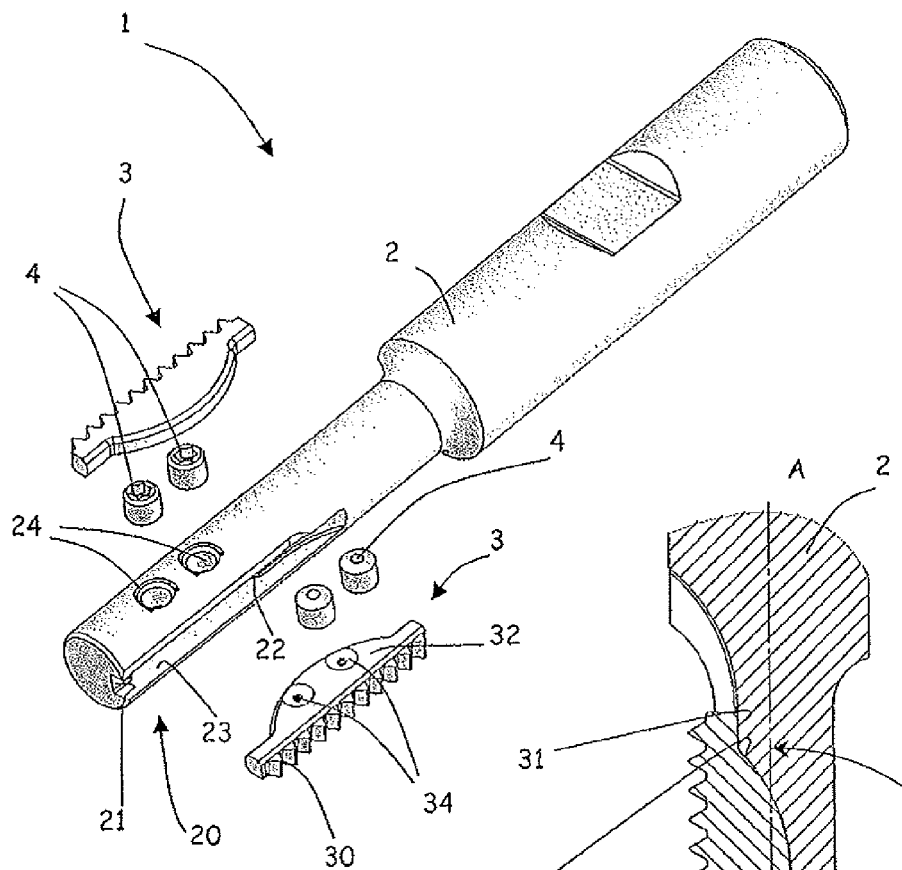
FIG. 6: is an exploded isometric view of a cutter with two inserts.
Figure 7:
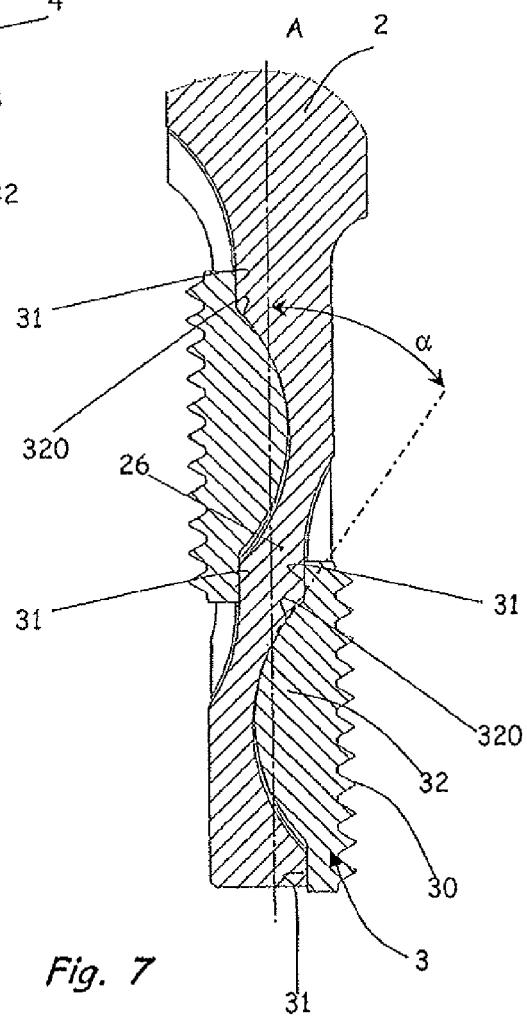
FIG. 7: is a schematic sectional top view of a detail of the cutter of FIG. 6.

As best seen in FIG. 4, with the exception of the recesses 34, the thickness of the insert 3 is essentially constant, i.e. the thickness of the protrusion 32 equals the thickness of the insert 3 for allowing an easy and cost-effective manufacturing of an insert 3 with high rigidity. FIGS. 6 and 7 show a second embodiment of an inventive thread-milling cutter 1 comprising a tool holder 2 and two cutting inserts 3 each with a longitudinal cutting edge 30 mounted thereon. The tool holder 2 is provided with two pockets 20 each adapted for receiving an insert 3. The pockets 20 overlap at least partly which results in a region 26 of the holder 2 being weakened by two pockets 20. However, the two pockets 20 are arranged such that the concave part of the pocket adapted for receiving the protrusion 32 are offset in the axial direction A. Therefore, compared with prior art thread-milling cutters, the area 26 is less weakened and the cutter 1 is more rigid than prior art cutters.

The invention claimed is:

1. A thread-milling cutter comprising:
   a tool holder comprising at least one pocket extending essentially in an axial direction (A) of the cutter; and
   at least one cutting insert, the at least one pocket of the tool holder adapted for receiving the at least one cutting insert, wherein the at least one cutting insert comprises:
   a longitudinal cutting edge,
   a first abutment surface defining at least one positioning plane opposite the longitudinal cutting edge for a radial positioning of the cutting insert in the respective pocket, and
   at least one protrusion provided on the abutment surface,
   wherein a side surface of the at least one protrusion is oriented at an angle (α) to the axial direction (A) of the cutter and adapted for contacting a complimentary surface of the pocket for an axial positioning of the insert, and
   wherein at least one lateral surface of the cutting insert contacts a lateral abutment surface of the respective pocket for positioning the cutting insert, and wherein at least one clamping element is provided for forcing the insert against the lateral abutment surface, and
   wherein the insert is provided with at least one recess for receiving the at least one clamping element,
   wherein the at least one recess for receiving the at least one clamping element is provided in the at least one protrusion.

2. The thread-milling cutter according to claim 1, wherein the side surface of the protrusion contacting the pocket and/or the complimentary surface of the pocket are arranged at an angle (α) of at least 30° to the axial direction (A) of the cutter.

3. The thread-milling cutter according to claim 2, wherein the side surface of the protrusion is oriented at an angle (α) of at least 40° to the axial direction of the cutter.

4. The thread-milling cutter according to claim 1, wherein the first abutment surface of the insert is provided with two positioning planes sandwiching the protrusion.

5. The thread-milling cutter according to claim 1, wherein the protrusion has a convex shape.

6. The thread-milling cutter according to claim 5, wherein the protrusion has a circular segment shape.

7. The thread-milling cutter according to claim 1, wherein the at least one recess and/or the at least one clamping element are each provided with a chamfer, so that during clamping the cutting insert is forced in the pocket.

8. The thread-milling cutter according to claim 1, wherein the tool holder is provided with at least two pockets adapted for receiving a cutting insert each, wherein the cutting edges of the inserts overlap at least partially in the axial direction of the cutter.

9. The thread-milling cutter according to claim 1, wherein the protrusion is symmetrical to a median plane perpendicular to the axial direction of the cutting insert.

10. The thread-milling cutter according to claim 1, wherein the at least recess is provided with a chamfer.

* * * * *